United States Patent [19]
Rasmussen

[11] Patent Number: 5,146,782
[45] Date of Patent: Sep. 15, 1992

[54] FLOWMETER

[76] Inventor: Torben B. Rasmussen, Thorsgade 68, 3. th., DK-2200 Copenhagen N, Denmark

[21] Appl. No.: 488,057
[22] PCT Filed: Nov. 1, 1988
[86] PCT No.: PCT/DK88/00176
  § 371 Date: Jun. 13, 1990
  § 102(e) Date: Jun. 13, 1990
[87] PCT Pub. No.: WO89/04464
  PCT Pub. Date: May 18, 1989

[30] Foreign Application Priority Data
  Nov. 13, 1987 [DK] Denmark .................. 5965/87

[51] Int. Cl.$^5$ ........................................... G01F 15/18
[52] U.S. Cl. ........................................ 73/273; 73/431; 73/201
[58] Field of Search ............ 73/273, 274, 431, 861.03, 73/861.77, 201; 361/380, 395, 413

[56]  References Cited
  U.S. PATENT DOCUMENTS 4,304,128 12/1981 Hafner et al. .
  4,420,794 12/1983 Anderson .................. 361/380 X
  4,484,479 11/1984 Eckhardt .
  4,727,410  2/1988 Higgin .................... 361/380 X
  4,776,214 10/1988 Moran et al. .
  4,798,092  1/1989 Lagergren et al. ............ 73/861.77
  4,848,164  7/1989 Quarve et al. ............... 73/861.77
  4,938,053 -7/1990 Jepson et al. ................ 73/202 X FOREIGN PATENT DOCUMENTS
  3221505 12/1983 Fed. Rep. of Germany .

*Primary Examiner*—Herbert Goldstein
*Attorney, Agent, or Firm*—Larson and Taylor

[57]  ABSTRACT

A gas flowmeter which is disposed between adjacent sections of a gas piping includes a central elongate housing. This housing includes a central gas passage, a plurality of sensor modules arranged in a row adjacent the central passage, and a distribution strip arranged along the sensor modules to conduct measuring signals therefrom. A plurality of electronic processing units are mounted about the elongate housing and in electrical contact with the distribution strip to process the signals from the modules and to then produce processed signals. These processing units are shell shaped with an open longitudinal side so as to fit onto and about a corresponding portion of the elongate housing. With this construction, a compact, lightweight and easy to repair gas flowmeter is provided.

8 Claims, 2 Drawing Sheets

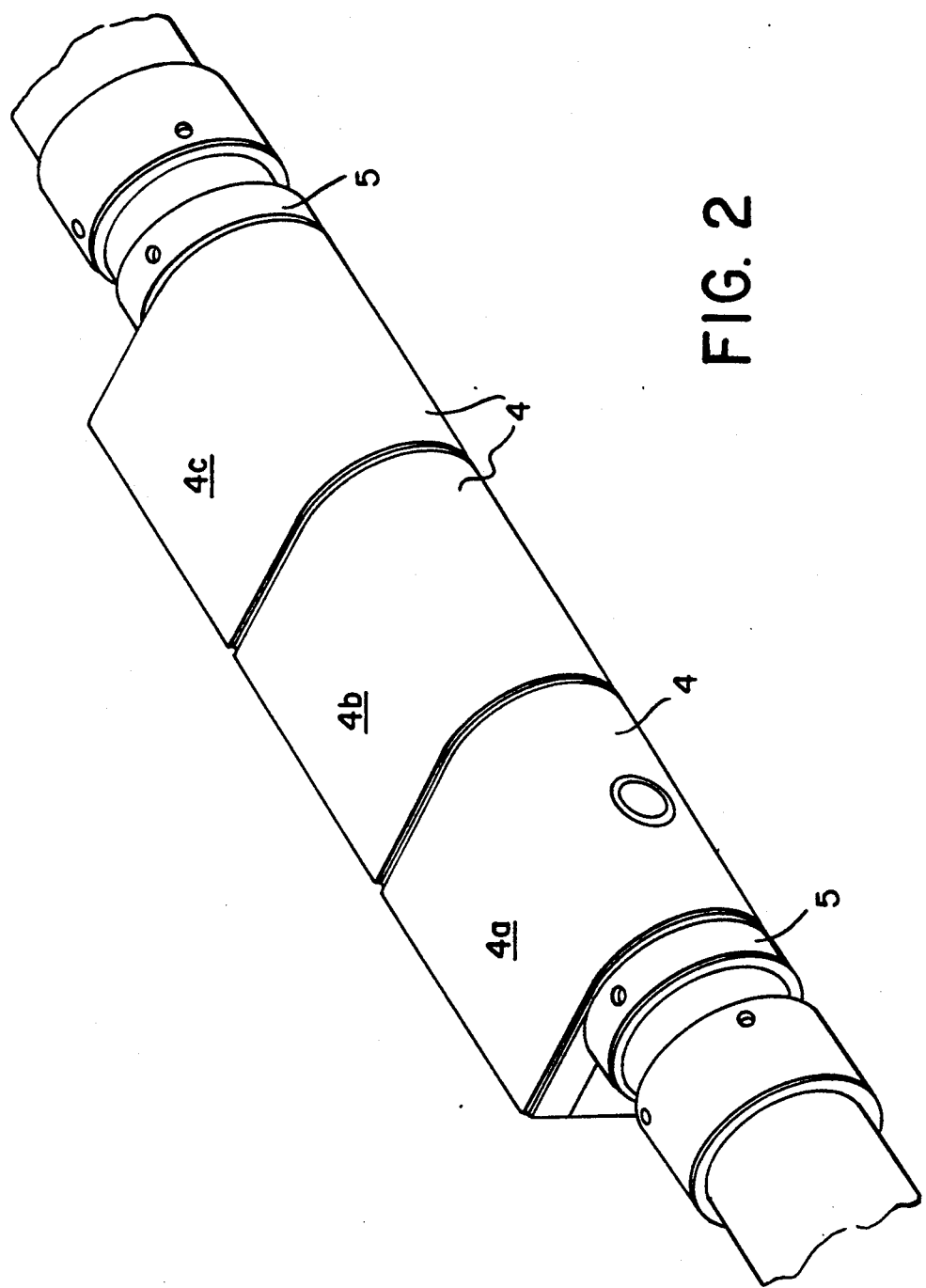

FLOWMETER

BACKGROUND OF THE INVENTION

The invention relates to a gas flowmeter of the kind where the sensor is made by a core or central housing containing the flow-sensors and the electronics for registration of the flow-measurement results, and the core is placed symmetrically with an inlet and an outlet tube in an axially symmetric line.

It is normal today to use gas meters for households that have relative large dimensions. This means that it can be difficult to place the meter in a convenient place for the user, particularly where interior decoration has to be considered. Furthermore, the installation of these meters is very difficult, partly due to the weight and partly due to the tubes for inlet and outlet to the meters. This tubing often demands many bends close to the meter.

A more compact gas meter than the above mentioned is among others known by U.S. Pat. No. 4,484,479. This meter is designed for axial mounting in a tube system, and contains a core with flow sensors for registration of gas flow and electronics for registration of the results. This known meter has the drawback that it is difficult to adjust and repair, since it is necessary to demount the meter from the tube system in which it is placed to do so.

A somewhat similar flowmeter is known from wopaper no. Wo 87/00917. In this meter, the sensors and the electronics are placed on a common film substrate which is encapsulated in two part housing. This means that the electronics are isolated from the sensors.

SUMMARY OF THE INVENTION

The object of the invention is to provide a gas flowmeter which is compact and easy to install, and which at the same time is easy to adjust and repair.

This object is obtained by the meter described hereinbelow by placing one or more sensor modules in the core or central housing, together with a distribution strip. On the outside of the core is placed shell-modules for the electronics.

The flowmeter is characterized by its structure of minimized modules for sensors and electronics, which become a part of the tube system. The system is placed in the direction of the tube, and its dimension and placement is an extension of the tube. The measurement of the consumption takes place on a straight line of the tube, on the way of the tube to the place of consumption.

On the basis of the newest technology, it is possible to reduce the modules of the measurement system and the electronic modules. It is the construction of these in a few well defined units that makes the meter easy to produce, program, and repair, even on location where the module under consideration is replaced. This also makes other combinations possible, by means of measuring modules used for other purposes.

The dimension of the core tube is reduced with respect to the maximum capacity and the maximum flow speed of the meter, which again relates to the capacity of the supply tube in such a way that the dimension of the core is less than the dimension of supply tube. This difference is used for placing the sensors and the electronics in order to optimize the construction.

The sensors are snapped into the core, where they are sitting in line with respect to the axial direction of the meter.

The electronics form the outer shell which is placed in the axial direction of the core in such a way that the meter forms an extension of the thickness of the tube.

The placing of the meter is no problem since it is a part of the tubing, which makes it very flexible to mount.

The meter has a separate display. This makes use of the gas flowmeter further flexible, as it can be placed at inaccessible places where it is not possible to read the meter. The display can then be placed in the best place.

There is no need for a separate suspension of the meter, due to the construction and low weight of the meter.

Since the inlet and outlet of the meter are placed in the axial direction, a very simple connection is achieved and the difficult mounting, and use of extensive tubing of prior meters are avoided.

The thickness of the meter is defined by the consumption, and the length by the number of measurements.

The entire construction makes the meter suitable for mass production by assembling, storage, packing and distribution.

The sensor and electronic modules can be placed in different order depending on the purpose.

This means that the sensors and the electronics are easily taken apart due to the easy removal of the distribution strip. It is therefore not necessary to separate the meter from the installation in order to change and/or repair the sensors and the electronics. This construction is also very suitable for placing a read-out display remote to the meter installation. The meter is, due to its modulized construction, also very suitable for mass-production assembling, storing, packing and distribution.

BRIEF DESCRIPTION OF THE DRAWINGS

The invention will hereafter be explained with reference to the drawings in which:

FIG. 2 shows an assembled gas flowmeter.

DETAILED DESCRIPTION OF THE PREFERRED EMBODIMENTS

Figure 1:
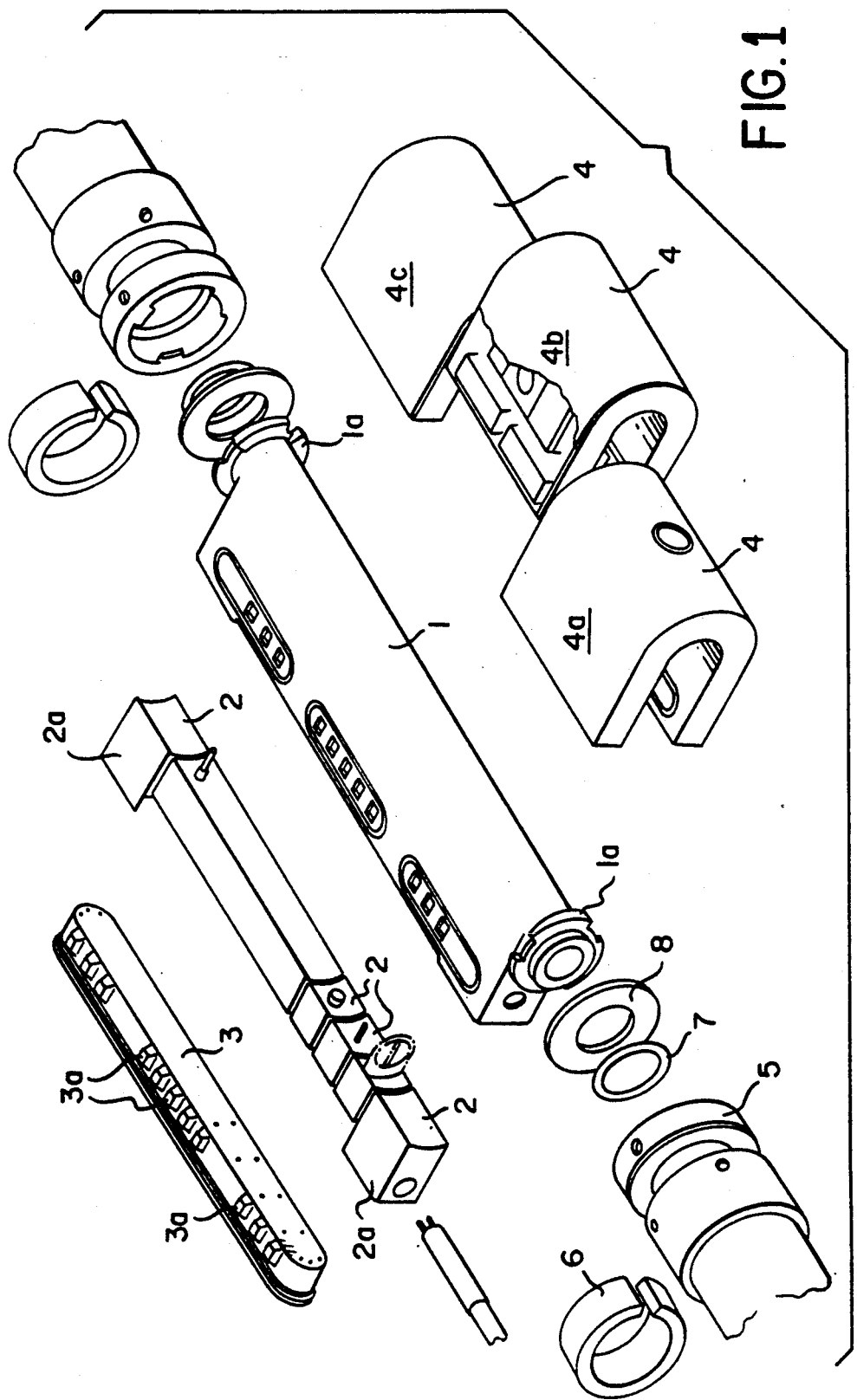
FIG. 1 shows the gas flowmeter in exploded view.

As shown in FIG. 1, the gas flowmeter consists of a core or central hosing (1) with a hole therethrough for gas transportation. In each end of the core is placed a connection fitting (1a) for axial connection of the core to the tube system. The tube system is fitted with a corresponding connection ring (5) for connection to the fitting (1a) of the core together with O-ring (7) and washer (8). After the connection, the connection points are sealed by a sealing ring (6) so unauthorized operation is prevented. FIG. 1 also shows that in core (1) are placed sensors and contact modules (2), such as temperature and pressure sensors. These modules are snapped into the core (1). In the shown example, the contact modules (2a) are placed in each end of the sensor modules and are equipped with a hole which matches with a hole in the core (1) for a cable connection., Inside the core (1) there is, beside the sensor and contact modules, a place for a distribution strip (3) which makes the electrical connection between sensor modules (2) and the electronic shell modules (4) discussed below. This strip receives current and distributes it to the shells 4 and the sensors 2. It distributes the impulses or signals from the sensors 2 to the shells 4, and from the shells to a remote display or the gas plant. The contact points 3a, from strip 3, extending through the core 1 to shells 4, are snapped in place. The electronics in the shells are molded.

The electronic shell modules (4) are constructed in such a way that they can be snapped onto the core (1) so that there is electrical contact with the distribution strip (3), and thereby with the sensor and contact modules (2).

The figure shows 3 electronic shells, the first shell (4a) is used for safety surveillance, the second shell (4b) is used for conversion of the measurement results, and the third (4c) is used for communication with the complete meter. The shells are produced so the electronics are molded in a tight material. As an example of the shell functions, the safety module will supply a signal when there is an abnormal consumption, in case of fire, earthquake, or a power supply failure and thereby cause a disconnection of the gas supply. The measurement shell registers and computes the measured values, and transmits the values to a display. This module is also able to store the measured values in case of power failure.

The communication shell will communicate with the gas plant for remote registration, and will also be able to receive messages from the gas plant such as for price regulation or disconnection of the supply.

The meter is connected to the tubes by connection fittings 5 which are formed as a combined telescopic/quick fixing in order to absorb some tolerances in an old installation. The connection forms a burglar proof locking ring. In the shown version, there is mentioned 3 shells, but this could be more or less for other applications. It would also be possible to have other relevant measurements or the like to take place inside or outside the shells.

The shown example shows 3 shells, but there will be no limitation within the limits of the invention to the numbers of shells. The external design of the meter can be different to the shown design, i.e. round or squared.

I claim:

1. A gas-flow meter which is disposed between adjacent sections of a straight portion of a gas piping having a piping longitudinal axis comprising:
   a central elongate housing which is connected between the adjacent sections of the piping and which is symmetrically located about a plane including the longitudinal axis of the piping, said elongate housing including therein
   a central gas passage about the longitudinal axis,
   a plurality of sensor modules arranged in a row adjacent said central passage which are adapted to measure characteristics of a gas flowing in the gas piping including flow and to generate measuring signals indicative of the measured characteristics, and
   a distribution strip which is arranged along said plurality of sensor modules in electrical contact therewith upon engagement with said sensor modules such that said distribution strip serves to conduct the measuring signals of said sensor modules; and
   a plurality of electronic processing units mounted about said elongate housing and in electrical contact with said distribution strip whereby the measuring signals conducted from said sensor modules are processed and processed signals from said units are thus produced, said units being shell shaped with an open longitudinal side so as to fit onto and about a corresponding portion of said elongate housing and make electrical contact with said distributor strip upon being fit onto said housing.

2. A gas-flow meter as claimed in claim 1 wherein said elongate housing is shaped in radial cross section so as to have opposed legs, said elongate housing including an opening along a length thereof between said legs which is also along said open longitudinal sides of said processing units such that through said opening is received said row of sensor modules and said distribution strip with said row of sensor modules disposed between said central gas passage and said distribution strip.

3. A gas-flow meter as claimed in claim 2 wherein said electronic processing units have a thickness dimension all of which are all equal, and which thickness dimension is equal to an outer dimension of the piping.

4. A gas-flow meter as claimed in claim 3 wherein said central gas passage includes an inlet at one end of said passage located symmetrically about said longitudinal axis and an outlet at the other end of said passage located symmetrically about said longitudinal axis.

5. A gas-flow meter as claimed in claim 1 and further including a connecting means for connecting said elongate housing at each end thereof to an adjacent section of the gas piping and for suspending said elongate housing and mounted processing units from the gas piping.

6. A gas-flow meter as claimed in claim 1 wherein the processed signals form said units are conducted to said distribution strip; and further including a cable connected to said distribution strip for supplying electrical power thereto and for relaying the processed signals to a remote location.

7. A gas-flow meter as claimed in claim 6 wherein said distribution strip distributes electrical power to at least one of said sensor modules.

8. A gas-flow meter as claimed in claim 1 and further including a snap connection means for electrically connecting said processing units and said distribution strip as said processing units are mounted to said elongate housing.

* * * * *